US007008513B2

(12) United States Patent
Davenport et al.

(10) Patent No.: US 7,008,513 B2
(45) Date of Patent: Mar. 7, 2006

(54) METHOD OF MAKING A PAPERMAKING ROLL COVER AND ROLL COVER PRODUCED THEREBY

(75) Inventors: Francis L. Davenport, Ballston Lake, NY (US); Maurice Paquin, Plainville, MA (US)

(73) Assignee: Albany International Corp., Albany, NY (US)

(*) Notice: Subject to any disclaimer, the term of this patent is extended or adjusted under 35 U.S.C. 154(b) by 329 days.

(21) Appl. No.: 10/334,209

(22) Filed: Dec. 31, 2002

(65) Prior Publication Data

US 2004/0127122 A1    Jul. 1, 2004

(51) Int. Cl.
*D21F 3/08* (2006.01)
*B05D 1/00* (2006.01)
*B05D 5/00* (2006.01)

(52) U.S. Cl. ............... 162/361; 162/358.1; 492/48; 442/76; 428/196; 427/195; 427/288; 427/389.9

(58) Field of Classification Search ............... 264/401; 428/375, 192–194, 195.1, 198, 200, 206, 428/212, 213, 220, 143, 147, 196; 442/64, 442/71, 59, 76, 148; 700/118–120; 427/466, 427/448, 470, 510, 513, 189, 195, 243, 244, 427/256, 288; 162/203–207, 306, 348, 358.2, 162/358.4, 900–904, 109–117, 360, 361, 162/358.1; 156/459, 460; 474/266–268; 492/48
See application file for complete search history.

(56) References Cited

U.S. PATENT DOCUMENTS

| | | | |
|---|---|---|---|
| 3,042,568 A | 7/1962 | Ludowici et al. | 156/137 |
| 3,149,003 A | 9/1964 | Christie et al. | |
| 3,175,792 A | 3/1965 | Smallian | 245/8 |
| 3,350,260 A | 10/1967 | Johnson | 162/116 |
| 3,501,366 A | 3/1970 | Bramley et al. | |
| 3,549,742 A | 12/1970 | Benz | |
| 3,613,258 A | 10/1971 | Jamieson | 34/95 |
| 3,673,023 A | 6/1972 | Ross | 156/137 |
| 3,720,578 A | 3/1973 | Heling et al. | |
| 3,994,662 A | 11/1976 | Bramley | |
| 4,109,543 A | 8/1978 | Foti | 74/231 |
| 4,111,634 A | 9/1978 | Limbach et al. | |
| 4,187,618 A | 2/1980 | Diehl | 34/243 |
| 4,191,609 A | 3/1980 | Trokhan | 162/113 |
| 4,239,065 A | 12/1980 | Trokhan | 139/383 |
| 4,251,928 A | 2/1981 | Rotar et al. | 34/116 |
| 4,300,982 A | 11/1981 | Romanski | 162/358 |
| 4,312,009 A | 1/1982 | Lange | 346/140 |
| 4,382,987 A | 5/1983 | Smart | 428/212 |
| 4,383,495 A | 5/1983 | Plichta et al. | 118/406 |
| 4,427,734 A | 1/1984 | Johnson | 428/234 |
| 4,482,430 A | 11/1984 | Majaniemi | 162/358 |
| 4,514,345 A * | 4/1985 | Johnson et al. | 264/425 |
| 4,528,239 A | 7/1985 | Trokhan | 428/247 |
| 4,529,480 A | 7/1985 | Trokhan | 162/109 |
| 4,567,077 A | 1/1986 | Gauthier | 428/114 |
| 4,571,798 A | 2/1986 | Adams | |
| 4,637,859 A | 1/1987 | Trokhan | 162/109 |
| 4,752,519 A | 6/1988 | Boyer et al. | |
| 4,917,937 A | 4/1990 | Lappanen et al. | |
| 4,981,745 A | 1/1991 | Lefkowitz | 428/147 |
| 5,066,532 A | 11/1991 | Gaisser | 428/137 |
| 5,084,326 A | 1/1992 | Vohringer | |
| 5,136,515 A | 8/1992 | Helinski | 364/468 |
| 5,238,537 A | 8/1993 | Dutt | 162/358.4 |
| 5,240,531 A | 8/1993 | Toda et al. | 156/137 |
| 5,277,761 A | 1/1994 | Van Phan et al. | 162/109 |
| 5,292,438 A | 3/1994 | Lee | |
| 5,298,124 A | 3/1994 | Eklund et al. | 162/306 |
| 5,360,656 A | 11/1994 | Rexfelt et al. | 428/193 |
| 5,397,438 A | 3/1995 | Nyberg et al. | 162/207 |
| 5,422,166 A | 6/1995 | Fleischer | |
| 5,462,642 A | 10/1995 | Kajander | 162/116 |

(Continued)

FOREIGN PATENT DOCUMENTS

| | | |
|---|---|---|
| DE | 196 51 557 | 6/1998 |
| EP | 0 487 477 | 5/1992 |
| EP | 0 568 509 | 11/1993 |
| EP | 0 613 729 | 9/1994 |
| EP | 0 677 612 A2 | 10/1995 |
| GB | 1 053 282 | 5/1963 |
| WO | WO 92/00415 | 1/1992 |

(Continued)

OTHER PUBLICATIONS

S. Ashley, Rapid Prototyping Systems, *Mechanical Engineering*, Apr. 1991, pp. 34-43.

Primary Examiner—Eric Hug
(74) Attorney, Agent, or Firm—Frommer Lawrence & Haug LLP; Ronald R. Santucci

(57) ABSTRACT

The present invention is a method for making a roll cover and a roll cover, wherein at least one material is applied to the surface of the roll or a base substrate. In a first embodiment, a single material is applied as a flowable phase. A uniform coating of the material is applied to the roll, and upon setting of the material, such as by cooling, curing, or other means, a smooth and permanent roll cover is formed upon the surface of the roll. In another embodiment, at least two materials are applied in flowable phases to the surface of the roll. The first material may be a sacrificial, removable first material, applied to the surface of the roll cover in a preselected pattern. After the sacrificial material has been applied, a second material, such as a functional resin, is applied to the surface of the roll cover with the sacrificial material removed after the second material has set. In another embodiment, the use of sacrificial material is avoided and the material is applied in a predetermined pattern. In a fourth embodiment, two or more different materials are applied.

67 Claims, No Drawings

U.S. PATENT DOCUMENTS

| | | |
|---|---|---|
| 5,506,607 A | 4/1996 | Sanders, Jr. et al. ............. 347/1 |
| 5,515,779 A | 5/1996 | Danby |
| 5,518,680 A | 5/1996 | Cima et al. |
| 5,556,509 A | 9/1996 | Trokhan et al. ............. 162/111 |
| 5,672,248 A | 9/1997 | Wendt et al. ................ 162/109 |
| 5,679,222 A | 10/1997 | Rasch et al. ............. 162/358.1 |
| 5,713,399 A | 2/1998 | Collette et al. ............. 139/383 |
| 5,714,041 A | 2/1998 | Ayers et al. ................ 162/111 |
| 5,731,059 A | 3/1998 | Smith et al. ................ 428/192 |
| 5,733,608 A | 3/1998 | Kessel et al. ............... 427/547 |
| 5,740,051 A | 4/1998 | Sanders, Jr. et al. .... 364/468.26 |
| 5,746,887 A | 5/1998 | Wendt et al. ................ 162/109 |
| 5,787,602 A | 8/1998 | Hsu et al. ...................... 34/116 |
| 5,804,036 A | 9/1998 | Phan et al. |
| 5,817,374 A | 10/1998 | Detig et al. ................. 427/466 |
| 5,817,377 A | 10/1998 | Trokhan et al. |
| 5,829,488 A | 11/1998 | Fagerholm et al. ......... 139/383 |
| 5,849,395 A | 12/1998 | Valentine et al. |
| 6,080,691 A | 6/2000 | Lindsay et al. ............. 442/381 |
| 6,099,781 A | 8/2000 | Ampulski |
| 6,120,642 A | 9/2000 | Lindsay et al. ............. 162/109 |
| 6,136,151 A | 10/2000 | Davenport et al. ......... 162/306 |
| 6,136,157 A | 10/2000 | Lindeberg et al. ........ 204/157.6 |
| 6,193,847 B1 | 2/2001 | Trokhan |
| 6,340,413 B1 | 1/2002 | Nilsson et al. .............. 162/361 |
| 6,350,336 B1 | 2/2002 | Paquin ........................ 156/93 |
| 6,358,030 B1 | 3/2002 | Ampulski |
| 6,358,594 B1 | 3/2002 | Ampulski |
| 6,398,910 B1 | 6/2002 | Burazin et al. |
| 6,419,795 B1 | 7/2002 | Dutt |
| 6,576,090 B1 * | 6/2003 | Trokhan et al. ............. 162/348 |
| 2001/0035598 A1 | 11/2001 | Ampulski |
| 2002/0107495 A1 | 8/2002 | Chen et al. |

FOREIGN PATENT DOCUMENTS

| | | |
|---|---|---|
| WO | WO 93/00474 | 1/1993 |
| WO | WO 96/35018 | 11/1996 |
| WO | WO 97/14846 | 4/1997 |
| WO | WO 99/35332 | 7/1999 |
| WO | WO 00/09308 | 2/2000 |
| WO | WO 02/088464 A1 | 11/2002 |
| WO | WO 2004/045834 A1 | 6/2004 |

* cited by examiner

METHOD OF MAKING A PAPERMAKING ROLL COVER AND ROLL COVER PRODUCED THEREBY

FIELD OF THE INVENTION

The present invention is directed to the field of papermaking, particularly to a method of making a roll cover and roll cover used in papermaking machines and processes. The invention concerns imparting surface characteristics and functionality to roll covers.

BACKGROUND OF THE INVENTION

In certain papermaking applications, a press nip on a papermaking machine is employed wherein the formed paper sheet contacts two dissimilar surfaces; the press fabric and one of the press rolls. Such press nips have, in the past, included a pair of counter-rotating steel rolls or a steel roll cooperating with a counter-rotating granite roll or the like.

Because the roll is smooth, no pattern or change in the paper product topography is caused during contact with this roll. The roll may also have some other function such as promoting paper smoothness as in a calender. The roll may also be a press roll. With a press roll, the sheet contacts the roll surface for some distance before the press nip that is formed by two rolls and a dewatering medium such as a press fabric. The paper sheet also contacts the roll surface for some distance after leaving the press nip. This arrangement not only enhances paper smoothness, but allows the sheet to be readily pulled off the roll surface easily and uniformly. If too much force is needed to cause separation, the wet paper sheet is drawn too much, loses MD stretch, and narrows in. In extreme situations the paper sheet will tear or break if the applied force is greater than the fiber-to-fiber bonds of the cellulose fibers that make up the paper. This causes loss of paper production and increases costs.

In certain applications, it has been found advantageous to cover the roll of the press nip with a cover for improving the surface characteristics of the resultant pressed web. Although various rubber compositions have been used in the fabrication of roll covers, polymeric materials have been used very successfully in the manufacture of such roll covers. The aforementioned polymeric materials may be reinforced with woven or non-woven fabric and may comprise single or multiple layers.

Roll covers are manufactured in a variety of ways, using varied materials such as rubber-like materials or metal alloys. Current methods of manufacturing roll covers include "laying up" sections of uncured mats of compounds onto a roll body, sometimes with textile reinforcement. This forms a roll cover of several sections, which is finished by heat curing to form a continuous cover. This cover is ground and may undergo other surface finishing steps. Another method used to form roll covers is to spiral wind a semi-solid resin onto a body, followed by curing and surface finishing. Steel strips may also be spiral wound onto the roll base in order to form a roll cover.

Yet another method is to cast or mold a resin-fiber system onto a mandrel or roll body, forming a composite system. Other covers may be formed of mixtures of resins (i.e., "alloys" of resins), metals and resins, ceramics, and the like. Roll covers can be applied with thermal coating techniques, such as arc spraying, powdered flame process, high velocity oxygen fuel (HVOF), and plasma spraying. (See e.g. "Beloit Partner" brochure, p. 25 (1995). Arc spraying primarily is used to coat or "clad" surfaces with metal or metals. Arc spraying parameters can be altered to provide desired surface properties such as hardness, porosity, thermal conductivity and bond strength. Powdered flame-spray processes are an economical alternative to plasma sprayed coatings and can be used where above-average resistance to corrosion and wear is desired. It is useful in applying a release coating. Plasma-coating processes use high temperatures and moderate spray velocities to produce a wide range of coatings. Yankeee Dryers, winder drums and after dryer shells are excellent applications for this process. HVOF-based coatings are applied in a process using high spray velocities to produce coatings with unusual properties. HVOF spraying is extremely dense, which means the coated finish can be ground to a fine grade smoothness. HVOF advances the ability to produce ceramet (ceramic and metallic) coatings, which combine the hardness and low porosity of ceramics with the flexibility of metals.

In this technique, oxygen and fuel are mixed in an HVOF spray gun. Once combined, they ignite to produce a supersonic gas jet traveling at speeds up to 4830 Km/h with an approximate temperature of 2816° C. A level of surface smoothness that can be attained with this process is greater than any other type of thermal spraying or metal manufacturing methods. In addition, HVOF coatings can assume different properties by spraying multicomponent powders. The bond strengths of HVOF coatings are also excellent.

Because the rolls used in papermaking process are both extremely heavy and very long, they tend to sag in the middle of the roll. Those skilled in the art have compensated for this by building up a crown in the center region of the roll., where the roll diameter may be up to 6 to 8 inches greater than the specified roll diameter. Furthermore, to insure an even load distribution across the length of the roll, the ends of the roll are tapered. Typically, the crown and the tapered end features are produced after the roll cover has been applied, usually by grinding and other surface treatments.

It would be advantageous to develop a method of forming a roll cover in which the differences in diameter across the length of the roll are provided for during application of the roll covering material, thereby eliminating or significantly reducing post processing steps that occur after the material has been applied, such as grinding.

Current release rolls include naturally occurring granite. Granite exhibits very good sheet release properties, resistance to chemical attack, resistance to wear from doctors, and can run for long intervals between grinds. However, it cannot run under high nip loading, is temperature sensitive, and can only be reground a limited number of times before the entire roll has to be replaced. Due to naturally occurring faults in granite, and the dangers of catastrophic failure, roll covers today have composite or alloy covers with a heterogeneous mixture of materials that are formed into a cover. Due to its heterogeneous nature, it allows the sheet to be released with forces low enough to avoid tearing the sheet. Expensive ceramics are also employed to form good release cover rolls. This mixing and the method of application assumes a relatively uniform dispersion of materials. This is not predictable however, and no two roll covers of the same mixture are therefore "exactly" alike.

Many of these covers have active (i.e., functional) surfaces that fulfill a desirable attribute, such as improving sheet release. See, for example, U.S. Pat. No. 6,136,157. Sheet release is a property of considerable importance to the paper maker, since there is a tendency for the wet paper sheet to follow the smoothest or wettest surface out of the press nip, which ordinarily is the roll cover. The wet paper sheet will follow the roll cover for a distance equivalent to part of the circumference of the roll cover as the sheet exits the nip. The sheet is literally pulled off the surface of the roll because the next downstream position is running at a higher speed. As speeds increase, the forces required to do this become substantial.

When the roll cover must provide a desirable attribute such as sheet release, it is important that it be applied uniformly. It should be understood that in at least some of the aforenoted techniques, application may not be uniform so that finishing steps such as surface grinding must be undertaken.

Where a press nip is arranged so that the formed paper sheet contacts two dissimilar surfaces, i.e., the press fabric and one of the press rolls, the surface characteristics of the roll cover can be used to emboss the formed paper sheet. That is, a pattern can be formed on the roll cover, with the pattern height, width, and depth dimensions which, when in contact with the formed paper sheet at high pressure, imparts a pattern to the paper sheet. Often in a press nip, the roll or rolls are patterned or vented to aid in water management. In this regard the outer face of the roll may be drilled or grooved in order to assist in channeling water away from the press nip. Additionally, roll covers have been used in the calendering of a web downstream from the press.

Methods of forming patterns on surfaces are described in the prior art. For example, U.S. Pat. No. 4,312,009 describes a device for projecting ink droplets onto a medium to print a pattern. A plate with holes is used to create the pattern on the medium. The pattern is determined by the arrangement of the holes on the plate.

U.S. Pat. No. 4,383,495 describes an apparatus for coating surfaces of a substrate. Fingers are inserted into holes in the substrate and ink is applied to the substrate surface. Upon removal of the fingers from the substrate, the ink is drawn into the substrate coating and walls.

U.S. Pat. No. 5,136,515 describes a three-dimensional article produced by layering droplets of two different materials. The first material forms the article. The second material provides support which is later removed.

U.S. Pat. No. 5,733,608 describes a system for coating a substrate. The substrate moves through a coating station where a coating and a carrying layer are applied to the substrate. The carrying layer is then removed leaving only the coating layer.

U.S. Pat. No. 5,817,374 describes a process for producing patterned articles by deposition of particles onto a surface. Particles are deposited onto the surface through a screen, mask or stencil. The arrangement of the holes in the screen, mask or stencil determines the resulting pattern.

SUMMARY OF THE INVENTION

The present invention is directed towards a method of making a roll cover wherein at least one material is applied to the surface of the roll body directly or to textile reinforcement which is defined by a substrate or base fabric. In a first embodiment, a single material is applied as a flowable phase, delivered by a computer controlled nozzle or nozzles of the piezo jet type. A uniform coating of the material is applied to the roll body, and upon setting of the material, such as by cooling, curing, or other means, a smooth and permanent roll cover is formed upon the surface of the roll. Differences in the diameter of the roll body across its length can be provided for by varying the amount of the applied material. In another embodiment, at least two materials are applied in flowable phases to the surface of the roll. The first material may be a sacrificial, removable first material which is applied to the surface of the roll cover in a preselected pattern by means of a computer controlled nozzle or piezo jet nozzle(s) to create a mold. After the sacrificial material has been applied, a second material, such as a functional polymeric resin is applied to the surface of the roll cover, within the space or spaces not filled by the sacrificial resin, also by means of a computer controlled nozzle which may also be of the piezo jet type or by other means suitable for the purpose. The sacrificial material may be a wax or a water soluble material, or some other material that is easily removed after the second material has set. In the case of wax or water-soluble materials, they can be removed by heat or submersion in water. In a third embodiment, the material being applied is done so by way of a computer controlled nozzle or nozzles in a recurrent manner layer by layer to create a desired pattern which is of a desired thickness. In this embodiment, the use of sacrificial material is avoided. In a fourth embodiment, two materials or more are applied, just as in the second embodiment, but instead of applying a sacrificial material as the first material, a different functional material is applied. In this way a roll cover may be formed of two or more different materials, each of which imparts different properties. For example, a roll cover can be provided with distinct regions having hydrophilic or hydrophobic qualities.

This in situ method of forming a roll cover offers advantages over the prior art methods. Multiple materials may be applied selectively in order to create discrete regions of the different materials, which may be used to localize a desired functional attribute. A grooved cover surface may be created, or the surface may be patterned in order to produce embossed tissue, towel, or paper/paperboard products and patterned nonwovens. With the present invention, resin can be selectively located in high resolution within a three dimensional coating matrix, thereby controlling functionality.

DETAILED DESCRIPTION OF THE PREFERRED EMBODIMENT

The roll cover may be formed directly on the roll body itself or may include a base substrate which may be any conventional roll base substrate known in the art, including a woven, nonwoven, or knitted fabric comprising yarns of any of the varieties such as monofilaments, plied monofilaments, multifilaments, plied multifilaments or staple fibers. For purposes of convenience, both methods will use the terminology roll cover base in the description herein. The roll covers of the present invention can be produced by using devices similar to those described in U.S. Pat. Nos. 5,506,607 and 5,740,051 entitled respectively "3-D Model Maker" and "3-D Model Making", the disclosures of which are incorporated herein by reference. For the present invention, the device has (A) a support means for supporting the roll during production of the roll cover; (B) drop-on-demand piezo jet means or other means suitable for the purpose for ejecting or depositing resin or other material onto the roll cover base: (1) a first material, and if desired, (2) a second material; (C) mounting means for mounting the drop-on-demand jet means for simultaneous movement in at least two directions of an X, Y, and Z coordinate system, relative to the surface of the roll, and (D) control means to control the movements in X, Y, and Z directions and to control the ejection or depositing of the first and second materials from the drop-on-demand means. The device will also require (E)

means for removing the first material in one embodiment described, if desired, and optionally (F) means for curing the second material.

The drop-on-demand piezo jet nozzle disclosed in U.S. Pat. No. 5,506,607 may be used in the present invention. Of course other means of depositing material may be utilized if suitable for the purpose, with a piezo jet being merely illustrative of one way to practice the present invention.

Whether one jet nozzle is employed or whether multiple jet nozzles are employed is a matter of choice for the skilled artisan. However it is preferable that a plurality of jets be utilized. As a practical matter an array of up to 256 piezo jets or more may be utilized if the technology permits. The jet nozzles may be arranged in parallel or in a staggered pattern relative to the roll cover or cross machine direction of the papermaking machine.

The removable or sacrificial resin of the present invention is any material which adheres to the roll cover base and is removable at a later time, i.e., after the second material has been applied in a pattern and has set. Two materials previously mentioned in this disclosure are waxes and water soluble materials, such as water soluble resins. Suitable soluble materials in solution include water soluble materials such as sugars, salts, polyvinyl alcohol, glycols, and polysaccharides. The solution may also be based on organic solvents and materials soluble therein, such as polycarbonate in chloroform or acetone.

The second material is to remain on the roll during its use. The second material imparts a surface characteristic to the roll cover, such as a pattern or grooves that have three dimensions, and/or may also impart functionality, such as improved sheet release. Among the materials which may be used as the second material are photopolymers curable with UV radiation such as reactive acrylated monomers and acrylated oligomers derived from urethanes, polyesters, polyethers, and silicones; aqueous-based latexes and dispersions and particle filled formulations, including acrylics and polyurethanes; filled latexes, two component systems that react in the presence of each other such as epoxies and urethanes; hot melts and moisture cured hot melts. These materials must be able to withstand the rotational and/or compressive forces that the roll cover is subjected to in its operating environment, as well as resist degradation from any hystersis, heat, moisture, or chemicals for a cost effective service life.

The second material could be selected to impart functionality to the roll cover. For instance, a suitable carrier resin may be selected for carrying a filler material or the like. The filler could be mica, which when deposited on the roll cover, imparts a degree of hydrophobicity and a degree of microroughness that may be desirable. In this regard reference is made to U.S. Pat. No. 6,136,151 entitled "Press Belt and Press Roll Cover for Papermaking", the disclosure of which is incorporated herein by reference, which provides for a roll cover having such features. It is envisioned that roll covers of that type and other types may be fabricated in accordance with this invention.

Also, a third material could be deposited. The third material can be applied in locations where the first and second materials have not been applied. The third material may contain no filler, or a lesser amount of filler than the second material, to provide a varying degree of microroughness and hydrophobicity.

Other macroscopically smooth rolls which have covers can be used as paper support rolls, or fabric support rolls, in other words, at locations other than the press nip. In these positions, sheet release is not as important as durability of the cover. A functional resin imparting improved durability could be selected for these kinds of rolls.

It is evident from this disclosure that a smooth, unitary roll cover can be produced using a single material, such as one of the aforedescribed second materials, or a combination thereof, in the absence of a removable first material. In this way, a smooth surface roll cover could be built up layer by layer, preferably by depositing droplets having a diameter of $10\mu$ (10 microns) or more. By controlling drop-on-demand piezo jet nozzles, a relatively greater amount of material (or lesser amount, as the case may be) may be applied to the desired region of the roll cover in a controlled manner in a controlled geometry in three planes (x, y and z) This permits the formation of a crown formed as part of the roll cover, and the formation of other variations in the diameter of the roll cover along the cross machine direction of length of the roll. With this technique, post-application processing steps, such as grinding, are eliminated, or post application processing time is substantially reduced.

In the second embodiment, a first removable material, such as, for example, a water soluble material is deposited onto the roll cover base in a preselected pattern. The material is deposited by the computer controlled piezo jet nozzles. The nozzles are controlled so that the material is deposited onto only preselected locations, in accordance with preselected length, width, height or depth dimensions, (x, y and z dimensions or directions) forming a three dimensional pattern. After the first material has set, a second material is deposited in a preselected pattern. The second material, such as an UV curable photopolymer resin, is deposited by computer controlled nozzles or by any other means suitable for the purpose such as bulk nozzles, blade coating or doctoring, since it can be applied in a less accurate manner than that of the sacrificial material. If the application is by nozzles, they could also be controlled so that the material is deposited only onto preselected locations, in accordance with preselected length, width and depth dimensions, forming a three dimensional pattern. Through control of the nozzles, the second material is deposited only onto those locations where the first material does not reside.

After the second material has been applied, it may be subjected to a curing step, which in this case is exposure to UV radiation. After curing, the first material is removed, which is affected by exposure to water by submersion, spraying, or other suitable technique. The roll cover is then finished in accordance with well known procedures. This process produces a roll cover having a layer of patterned three dimensional resin.

The kinds of rolls described in this embodiment may exhibit a pattern on the surface of the roll. In a press section, covers having a patterned arrangement include suction rolls where a pattern of holes is drilled all the way through a cover to allow fluid (water and air) to pass through the cover; blind drilled, wherein the holes look like suction holes but only partially go into the cover thickness for temporary storage of fluid; and grooved where circumferential channels are cut into the cover surface in a repeatable pattern, also to enhance fluid handling. These rolls are also in a press nip formed by another roll or shoe. They are always inside of a press fabric which keeps the wet paper sheet from directly contacting these rolls. Otherwise, objectionable sheet marking or localized sheet breakage may occur, causing loss of paper production.

In the third embodiment of the present invention, the use of sacrificial material is avoided. In this regard the material, which may be a polymeric resin, is deposited onto the roll cover base substrate in a predetermined pattern. If a base substrate is used, the polymeric resin material penetrates into the base substrate, and, when desired, forms a layer of a desired thickness thereover, in the predetermined pattern. The pattern may be a continuous network extending substantially throughout both dimensions of the surface of the base substrate and defining an array of discrete open areas which are to be the ultimate locations of a corresponding array of discrete holes through the cover being manufactured, or on the surface of the base substrate. The discrete open area may form outlines or other representations of the desired pattern.

Alternatively, the material may be deposited in a semicontinuous network, for example, a semicontinuous pattern extending substantially on the base substrate in an essentially linear fashion, thereby forming lines which are generally parallel and equally spaced from one another. Such lines may be either straight, curved, zigzag or other patterns. More generally, a semicontinuous network comprises straight or curved lines, or lines having both straight and curved segments, which are spaced apart from one another and do not cross one another.

In such cases, the material impregnates the base substrate and, when desired, rises to a predetermined height above the surface of the base substrate at the locations where it is deposited. As such, the material could ultimately be entirely within the surface plane of the base substrate, even with the surface plane of the base substrate or above the surface plane of the base substrate.

Further, in a fourth embodiment piezo jet nozzles may be used to deposit one polymeric resin material at one time and a different polymeric resin material at another time to produce a surface having micro regions of more than one type of polymeric resin material. If a piezo jet nozzle array is used, some nozzles can deliver one material while others simultaneously deliver another material. In this way a roll cover can be formed of two (or more) different materials which imparts different properties (e.g. hydrophilic areas and hydrophobic areas).

Another topographical roll cover is one which has a topography meant to be transformed to the paper sheet during some part of the papermaking process. These embossing rolls are expensive to make. They can be found in the dryer or finishing sections of a paper machine. In some instances, these rolls can be found in the forming section of a paper machine, used as a dandy roll to impart a desired "watermark" on the sheet. They can even be in an off line or separate calendering operation. These embossing rolls are used to make art board, cover stock, greeting cards, tissue and towel products. They are also used in the manufacture of patterned nonwovens such as diaper liners, sanitary napkin liners, and the like. The present invention can be used to make such roll covers.

As aforesaid, the material can be applied by way of a piezo jet nozzle or nozzles, each of which is computer-controlled or by other means suitable for the purpose.

To create the pattern, the material is deposited in a repeating manner, layer by layer to build up the desired amount and/or shape, preferably in the form of extremely small droplets having a nominal diameter of preferably $10\mu$ (10 microns) or more such as $50\mu$, (50 microns), or $100\mu$ (100 microns).

The degree of precision of the jet in depositing the material will depend upon the dimensions and shape of the structure being formed. The type of jet used and the viscosity of the material being applied will also impact the precision of the jet selected.

In the present invention, in which a piezo-jet nozzle or nozzles are used to deposit polymeric resin material onto or within selected areas of the surface of the substrate, the choice of polymeric resin material is limited by the requirement that its viscosity be 100 cps (100 centipoise) or less at the time of delivery, that is, when the polymeric resin material is in the nozzle of a piezo jet ready for deposition, so that the individual piezo jets can provide the polymeric resin material at a constant drop delivery rate.

In this regard, the viscosity of the sacrificial material at the point of delivery in conjunction with the jet size defines the size and shape of the droplets formed on the roll (or base substrate) and in time the resolution of the pattern ultimately achieved. A second requirement limiting the choice of polymeric resin material is that it must partially set during its fall, as a drop, from a piezo jet to the roll cover base or after it lands on it to prevent the polymeric resin material from flowing, and to maintain control over the polymeric resin material in the x, y, z directions to ensure its deposition in the desired pattern. Suitable polymeric resin materials which meet these criteria are:

1. Hot melts and moisture-cured hot melts;
2. Two-part reactive systems based on urethanes and epoxies;
3. Photopolymer compositions consisting of reactive acrylated monomers and acrylated oligomers derived from urethanes, polyesters, polyethers, and silicones; and
4. Aqueous-based latexes and dispersions and particle-filled formulations including acrylics and polyurethanes.

As noted above, the piezo jet nozzle is capable of supplying the polymeric resin material in the form of extremely small droplets having an average diameter of $10\mu$ (10 microns) or more, so long as its viscosity is less than 100 cps (100 centipoise). Moreover, the piezo jet nozzle can deposit the polymeric resin material with great precision one layer at a time in a repeat pattern or layering so as to control the height or depth (the z-direction or dimension) of the material deposited, making it unnecessary to grind the surface of a layer formed thereby to achieve the desired thickness (or crown), and enables one of ordinary skill in the art to control the z-direction geometry of the polymeric resin material. The piezo jet nozzle can deposit the polymeric resin material with such precision that the surface will be smooth without having to be ground or, alternatively, that the surface will have some predetermined three-dimensional structure.

Note the pattern can be random, a repeating random pattern or such patterns that are repeatable from cover to cover for quality control.

Although preferred embodiments have been disclosed and described in detail herein, their scope should not be limited thereby rather their scope should be determined by that of the appended claims.

What is claimed:

1. A method for manufacturing a roll cover for use on a roll used in the production of paper and paper products, said method comprising the steps of:
    a) providing a surface on which the roll cover is formed;
    b) depositing polymeric resin material onto said surface in a controlled manner so as to control the x, y, z dimensions of said material deposited to create a predetermined pattern of deposits, wherein each deposit comprises one or more droplets of polymeric resin on a roll cover; and
    c) at least partially setting said polymeric resin material.
2. The method as claimed in claim 1, wherein said roll has an exterior circumferential surface and said exterior surface is that upon which the polymeric resin material is deposited.

3. The method as claimed in claim 1, wherein said surface comprises a base substrate.

4. The method as claimed in claims 1, 2 or 3 further comprising depositing said polymeric resin material on said surface in a controlled fashion to provide said polymeric resin material with a uniform thickness and a smooth, macroscopically monoplanar surface.

5. The method as claimed in claims 1, 2 or 3 further comprising depositing said polymeric resin on said surface in a controlled fashion to provide said polymeric resin material with a non-uniform thickness which is thickest in the center of the roll cover and gradually tapers going away from the center so as to create a crowned roll cover.

6. The method as claimed in claim 1 wherein, in step b), said predetermined pattern comprises a plurality of discrete locations set forth in a predetermined array.

7. The method as claimed in claim 1 wherein, in step b), said predetermined pattern comprises a continuous network defining a plurality of discrete open areas in a predetermined array.

8. The method as claimed in claim 1 wherein, in step b), said predetermined pattern comprises a semicontinuous network.

9. The method as claimed in claim 3 wherein, in step b), said polymeric resin material penetrates into said base substrate.

10. The method as claimed in claim 3 wherein, in step b), said polymeric resin material forms a uniform or random pattern layer of desired thickness over said base substrate.

11. The method as claimed in claims 1, 2 or 3 wherein, in step b), said polymeric resin material is deposited by a piezo jet nozzle means which is computer-controlled.

12. The method as claimed in claim 11 wherein said piezo jet nozzle means includes a plurality of piezo jet nozzles in an array, each of which is individually computer-controlled.

13. The method as claimed in claim 1, wherein said polymeric resin material is selected from the group consisting of:
   1. hot melts and moisture-cured hot melts;
   2. two-part reactive systems based on urethanes and epoxies;
   3. photopolymer compositions consisting of reactive acrylated monomers and acrylated oligomers derived from urethanes, polyesters, polyethers, and silicones; and
   4. aqueous-based latexes and dispersions and particle-filled formulations including acrylics and polyurethanes.

14. The method as claimed in claim 11 wherein a first polymeric resin material is deposited and a second polymeric resin material is also deposited which is different from the first polymeric resin material.

15. The method as claimed in claim 10 wherein said polymeric resin material is deposited in a uniformly thick layer having a monoplanar surface.

16. The method as claimed in claim 10 wherein said polymeric resin material is deposited in a nonuniformly thick layer having a surface with a three-dimensional structure.

17. The method as claimed in claim 1 further comprising the step of depositing a polymeric resin material onto said base substrate in said predetermined pattern with a bulk jet to accelerate the manufacture of said roll cover.

18. The method as claimed in claim 17 wherein said depositing step is carried out prior to step b) in claim 1.

19. The method as claimed in claim 17 wherein said depositing step is carried out simultaneously with step b) in claim 1.

20. The method as claimed in claim 3 wherein said base substrate is selected from the group consisting of woven, non-woven and knitted fabrics comprising yarns including monofilaments, plied monofilaments, multifilaments, plied multifilaments and staple fibers.

21. The method as claimed in claim 1 wherein said droplets have an average diameter of $10\mu$ (10 microns) or more.

22. A method for manufacturing a roll cover for use on a roll used in the production of paper and paper products, said method comprising the steps of:
   a) providing a surface on which the cover is formed;
   b) depositing sacrificial material onto said surface in a controlled manner so as to control the x, y, z dimensions of said material deposited to create a predetermined pattern of deposits, wherein each deposit comprises one or more droplets of sacrificial material;
   c) depositing a polymeric resin material onto said surface having said sacrificial material to fill areas thereof not having said sacrificial material;
   d) at least partially setting said polymeric resin material; and
   e) removing the sacrificial material from said surface.

23. The method as claimed in claim 22, wherein said roll has an exterior circumferential surface and said exterior surface is that upon which the polymeric resin material is deposited.

24. The method as claimed in claim 22, wherein said surface comprises a base substrate.

25. The method as claimed in claims 22, 23 or 24 further comprising depositing said polymeric resin material on said surface in a controlled fashion to provide said polymeric resin material with a uniform thickness and a smooth, macroscopically monoplanar surface.

26. The method as claimed in claims 22, 23 or 24 further comprising depositing said polymeric resin on said surface in a controlled fashion to provide said polymeric resin material with a non-uniform thickness which is thickest in the center of the roll cover and gradually tapers going away from the center so as to create a crowned roll cover.

27. The method as claimed in claim 22 wherein, in step b), said predetermined pattern comprises a plurality of discrete locations set forth in a predetermined array.

28. The method as claimed in claim 22 wherein, in step b), said predetermined pattern comprises a continuous network defining a plurality of discrete open areas in a predetermined array.

29. The method as claimed in claim 22 wherein, in step b), said predetermined pattern comprises a semicontinuous network.

30. The method as claimed in claim 24 wherein, in step b), said sacrificial material penetrates into said base substrate.

31. The method as claimed in claim 24 wherein, in step b), said sacrificial material forms a uniform or random pattern layer of desired thickness over said base substrate.

32. The method as claimed in claim 22 wherein, in step b), said sacrificial material is deposited by a piezo jet nozzle means which is computer-controlled.

33. The method as claimed in claim 32 wherein said piezo jet nozzle means includes a plurality of piezo jet nozzles in an array, each of which is individually computer-controlled.

34. The method as claimed in claim 22 wherein said sacrificial material is a wax removable by heating.

35. The method as claimed in claim 22 wherein said sacrificial material is a solvent-removable material.

36. The method as claimed in claim 22 wherein, in step c), said polymeric resin material forms a layer of desired thickness over said surface.

37. The method as claimed in claim 22, wherein said polymeric resin material is selected from the group consisting of:
 1. hot melts and moisture-cured hot melts;
 2. two-part reactive systems based on urethanes and epoxies; and
 3. photopolymer compositions consisting of reactive acrylated monomers and acrylated oligomers derived from urethanes, polyesters, polyethers, and silicones; and
 4. aqueous-based latexes and dispersions and particle-filled formulations including acrylics and polyurethanes.

38. The method as claimed in claim 34 wherein said removing step is performed by heating.

39. The method as claimed in claim 35 wherein said removing step is performed by the action of an appropriate solvent.

40. The method as claimed in claim 22 wherein, in step c), said polymeric resin material is deposited onto said surface by a bulk-jet array.

41. The method as claimed in claim 22 wherein, in step c), said polymeric resin material is deposited onto said surface with a piezo jet array by which said polymeric resin material is deposited in droplets having an average diameter of $10\mu$ (10 microns) or more.

42. The method as claimed in claim 22 wherein, in step c), said polymeric resin material is deposited by spraying.

43. The method as claimed in claim 22 wherein, in step c), said polymeric resin material is deposited onto said surface by blade coating or doctoring.

44. The method as claimed in claim 33 wherein a first polymeric resin material is deposited and a second polymeric resin material is also deposited which is different from the first polymeric resin material.

45. The method as claimed in claim 41 wherein said polymeric resin material is deposited onto said surface in a uniformly thick layer having a monoplanar surface.

46. The method as claimed in claim 41 wherein said polymeric resin material is deposited onto said surface in a nonuniformly thick layer having a surface with a three-dimensional structure.

47. The method as claimed in claim 24 wherein said base substrate is selected from the group consisting of woven, non-woven and knitted fabrics comprising yarns including monofilaments, plied monofilaments, multifilaments, plied multifilaments and staple fibers.

48. The method as claimed in claim 22 wherein the sacrificial material is selected from the group consisting of sugars, salts, polyvinyl alcohol, glycols and polysaccharids, organic solvents and materials soluble therein.

49. The method as claimed in claim 22 wherein said droplets have an average diameter of $10\mu$ (10 microns) or more.

50. A roll cover for use on a roll used in the production of paper and paper products, said roll cover being made in a manner comprising the steps of:
 a) providing a surface on which the roll cover is formed;
 b) depositing polymeric resin material onto said surface in a controlled manner so as to control the x, y, z dimensions of said material deposited to create a predetermined pattern of deposits, wherein each deposit comprises one or more droplets of polymeric material; and
 c) at least partially setting said polymeric resin material.

51. The roll cover as claimed in claim 50, wherein said surface comprises a base substrate.

52. The roll cover as claimed in claim 50 further comprising depositing said polymeric resin material on said surface in a controlled fashion to provide said polymeric resin material with a uniform thickness and a smooth, macroscopically monoplanar surface.

53. The roll cover as claimed in claim 50 further comprising depositing said polymeric resin on said surface in a controlled fashion to provide said polymeric resin material with a non-uniform thickness which is thickest in the center of the roll cover and gradually tapers going away from the center so as to create a crowned roll cover.

54. The roll cover as claimed in claim 50 wherein, in step b), said polymeric resin material is deposited by a piezo jet nozzle means which is computer-controlled.

55. The roll cover as claimed in claim 54 wherein said piezo jet nozzle means includes a plurality of piezo jet nozzles in an array, each of which is individually computer-controlled.

56. The roll cover as claimed in claim 50 wherein said base substrate is selected from the group consisting of woven, non-woven and knitted fabrics comprising yarns including monofilaments, plied monofilaments, multifilaments, plied multifilaments and staple fibers.

57. The roll cover as claimed in claim 50 wherein a first polymeric resin material is deposited and a second polymeric resin material is deposited which is different from the first polymeric resin material.

58. The roll cover as claimed in claim 50 wherein said droplets have an average diameter of $10\mu$ (10 microns) or more.

59. A roll cover for use on a roll used in the production of paper and paper products, said roll cover being made in a manner comprising the steps of:
 a) providing a surface on which the cover is formed;
 b) depositing sacrificial material onto said surface in a controlled manner so as to control the x, y, z dimensions of said material deposited to create a predetermined pattern of deposits, wherein each deposit comprises one or more droplets of sacrifical material;
 c) depositing a polymeric resin material onto said surface having said sacrificial material to fill areas thereof not having said sacrificial material;
 d) at least partially setting said polymeric resin material; and
 e) removing the sacrificial material from said surface.

60. The roll cover as claimed in claim 59, wherein said surface comprises a base substrate.

61. The roll cover as claimed in claim 59 further comprising depositing said polymeric resin on said surface in a controlled fashion to provide said polymeric resin material with a non-uniform thickness which is thickest in the center of the roll cover and gradually tapers going away from the center so as to create a crowned roll cover.

62. The roll cover as claimed in claim 60 wherein, in step b), said sacrificial material penetrates into said base substrate.

63. The roll cover as claimed in claim 59 wherein, in step b), said sacrificial material forms a layer of desired thickness over said base substrate.

64. The roll cover as claimed in claim 59 wherein, in step b), said sacrificial material is deposited by a piezo jet nozzle means which is computer-controlled.

65. The roll cover as claimed in claim 64 wherein said piezo jet means includes a plurality of piezo jet nozzles in an array, each of which is individually computer-controlled.

66. The roll cover as claimed in claim 59 wherein said base substrate is selected from the group consisting of woven, non-woven and knitted fabrics comprising yarns including monofilaments, plied monofilaments, multifilaments, plied multifilaments and staple fibers.

67. The roll cover as claimed in claim 59 wherein said droplets have an average diameter of $10\mu$ (10 microns) or more.

* * * * *